May 3, 1960  B. GLAUS  2,935,424
METHOD OF AND APPARATUS FOR POURING VARNISH
Filed March 25, 1958  2 Sheets-Sheet 1

INVENTOR.
Bernhard Glaus
BY
Patent Agent

May 3, 1960 B. GLAUS 2,935,424
METHOD OF AND APPARATUS FOR POURING VARNISH
Filed March 25, 1958 2 Sheets-Sheet 2
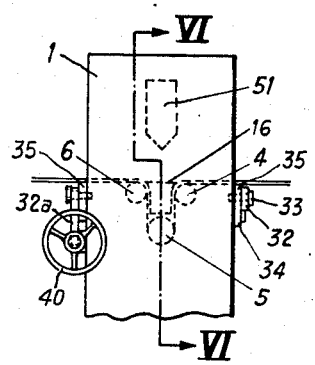
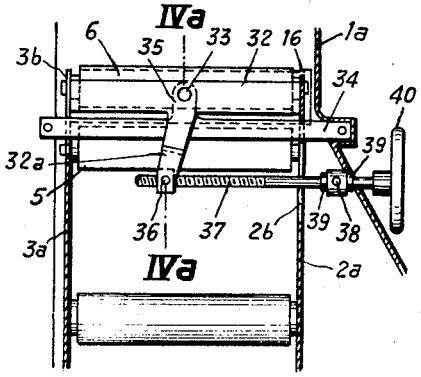
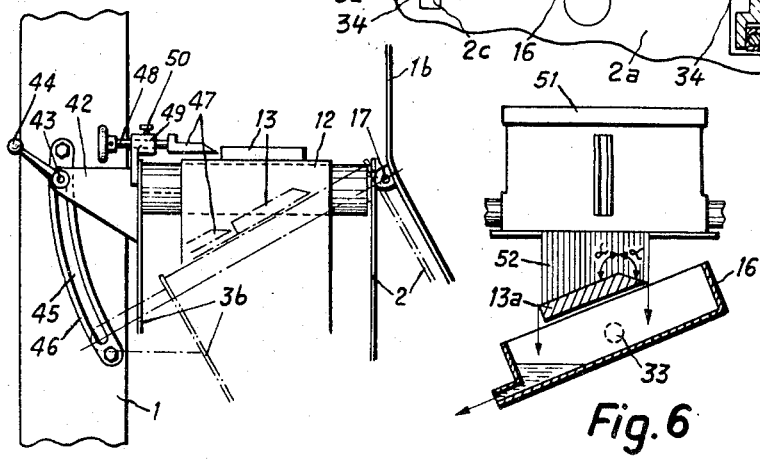
INVENTOR.
Bernhard Glaus
BY

United States Patent Office 2,935,424
Patented May 3, 1960

2,935,424

METHOD OF AND APPARATUS FOR POURING VARNISH

Bernhard Glaus, St. Gallen, Switzerland, assignor to Ulrich Steinemann Aktiengesellschaft, St. Gallen-Winkeln, Switzerland Application March 25, 1958, Serial No. 723,778

Claims priority, application Switzerland April 25, 1957

3 Claims. (Cl. 117—102)

Methods of and machines for pouring varnish are known in which a work piece is placed on a horizontally supported and horizontally movable table such as a conveyor belt or two serially arranged conveyor belts, and in which the work piece moves below a varnish discharge nozzle, while a varnish collector trough is arranged below the said nozzle. Such machine or apparatus is suitable for pouring a varnish film upon a surface of a board or of a strip of sheet metal or the like which is flat across its width. If, however, the work piece comprises two surfaces which in the longitudinal direction of the work piece form an angle with each other, as is the case for instance with frame or frieze moldings or skirting boards, the surfaces of such moldings or boards cannot be coated because one of said surfaces is horizontal while the other surface is disposed at a distinct angle with regard to the horizontal plane. The varnish flowing on the inclined surface immediately drains off from said inclined surface, whereas the varnish on the horizontal surface stays thereon. Consequently, the varnish film obtained in this way has a non-uniform thickness.

It is, therefore, an object of the present invention to provide an improved method of and device for pouring varnish upon a work piece, which will overcome the above mentioned drawbacks.

It is also an object of this invention to provide an apparatus for pouring varnish on a work piece, which will make it possible to vary the position of the work piece supporting means with regard to a horizontal plane.

These and other objects and advantages of the invention will appear more clearly from the following specification in connection with the accompanying drawings, in which:

Fig. 3 illustrates a modification of the tilting arrangement for the work piece supporting table.

Fig. 4 is a side view of the device shown in Fig. 3.

Fig. 4a is a section along the line IVa—IVa of Fig. 4.

Fig. 5 is a side view of a further modified arrangement for tiltably supporting the work piece supporting table.

Fig. 6 is a section along the line VI—VI of Fig. 3.

The method according to the present invention is characterized primarily in that the work piece which has two surfaces inclined relative to each other in the longitudinal direction of the work piece conveying means is moved underneath the varnish discharging nozzle in such a way that both of said inclined surfaces are placed at the same angle with regard to the vertical plane, i.e. with regard to the direction of flow of the varnish from said varnish discharging nozzle. The method according to the invention is preferably carried out by means of a machine in which a table supporting the work piece passes underneath the discharging nozzle and is tiltable about an axis arranged in the direction of feed of the work piece. The table is adapted to be adjusted to and held stationary at a desired angle transverse to the direction of feed of the work piece.

Figure 1:
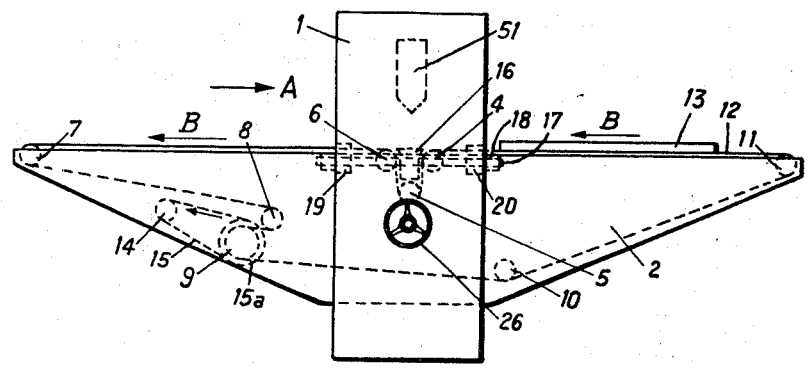
Fig. 1 is a side view of a varnish pouring machine according to the present invention.
Figure 2:
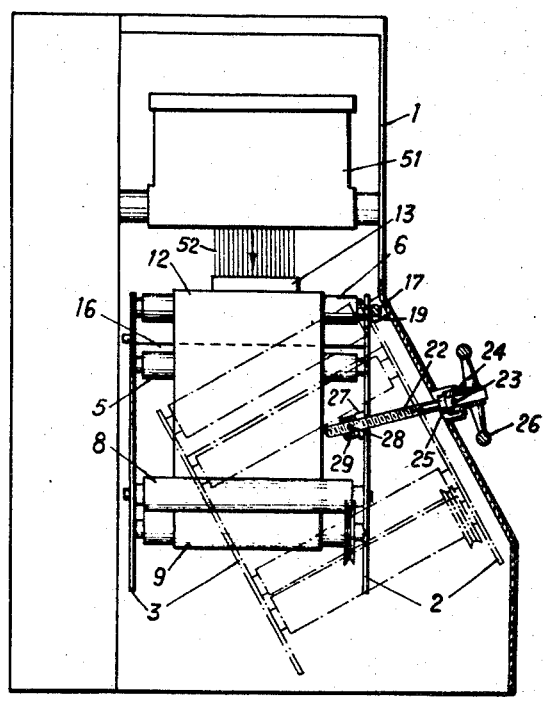
Fig. 2 is an end view of the machine of Fig. 1 as seen in the direction of the arrow A.

Referring now to the drawings in detail and Figs. 1 and 2 thereof in particular, the structure shown therein comprises a transverse frame 1 and two side walls 2 and 3 of a conveyor table within which the conveyor belt 12 is passed over rollers 4, 5, 6, 7, 9, 10 and 11. The conveyor belt 12 is moved in the direction of the arrows B by means of an infinitely variable drive 14 of any standard type which for instance through the intervention of a V-belt 15 passing over a pulley 15a drives the roller 9. Instead of employing two conveyor belts, one for each side of the table, for forming a gap for the collector trough, as it has been customary heretofore, according to the present invention, a conveyor belt 12 is passed over rollers 4, 5 and 6 which are triangularly disposed with regard to each other. It is in the thus formed triangle that a varnish collecting trough 16 is inserted so that the work piece 13 will freely move over the collecting trough 16 between the rollers 4 and 6. In order to be able to place the conveyor table and collecting trough 16 at an inclination, the wall 2 of the conveyor table supports a shaft 17 in bearings 18, while shaft 17 is rotatably journalled in bearings 19 and 20 connected to the front wall of the transverse frame 1. As a result thereof, the table is adapted to be tilted into the position indicated in Fig. 2 by dot-dash lines. The tilting of the table is effected in conformity with Fig. 2 of the drawing by a threaded spindle 22 which is journalled in a bearing 24 tiltable about trunnions 23. The said threaded spindle is held in its respective axial position by a setting ring 25 and a handwheel 26. It will thus be evident that the spindle 22 is rotatable by means of the handwheel 26. The side wall 2 of the table has connected thereto two eyes 27 having rotatably journalled therein the pivots 28 of the threaded nut 29. The thread of spindle 22 engages the threaded nut 29 and by means of the trunnions 23 and pivots 28 of the bearing 24 and the threaded nut, spindle 22 will be able when tilting the table to adjust itself accordingly.

Referring now to Figs. 3 to 4a, these figures show a modification in which the table is provided with transverse connections 32 having bolts 33 rotatably journalled therein. Frame 1a has connected thereto cross connections 34 provided with upwardly directed arms 35 into which bolts 33 have been firmly screwed. The sidewalls 2a and 3a of the table are provided with bores 2b, 2c, 3b (Fig. 4 and 4a) through which the connection 34 and the spindle 37, respectively extend. In order to tilt the table about bolts 33 and to adjust the same to its desired position, one of the cross connections 32 is provided with an arm 32a. The end of arm 32a has journalled therein a nut 36 for a spindle 37. The transverse frame 1a has connected thereto a pivot 38 with a sleeve which serves as bearing for spindle 37. Spindle 37 is provided with setting rings 39 and therefore is rotatable and tiltable on bolt 38 but is axially non-displaceable. Furthermore mounted on spindle 37 is a handwheel 40. By rotation of said handwheel, through the intervention of arm 32a and the transverse connection 34, the table may be brought into an inclined position as shown in Fig. 6.

Fig. 5 illustrates a further modification according to the present invention in which the table is tiltable about shaft 17 according to Fig. 2. For adjusting the table in the desired position, the wall 3b thereof is provided with an arm 42, a bolt 43 and a nut 44 forming a lever. Bolt 43 is adapted to slide in a slot 45 of guiding means 46 which is connected to frame 1b coaxially with regard to shaft 17. Fig. 5 furthermore shows an abutment ledge 47 connected to bolts 48 which are displaceably journalled in bearings 49 connected to the side wall 3b of the table. The said bolts 48 are adapted by means of a screw 50 to be arrested in their respective desired position so that when the table occupies its inclined position, the ledge is prevented from sliping off. If desired, ledge 47 which serves as abutment for a workpiece may also be provided with rollers.

Fig. 6 illustrates a section along the line VI—VI of Fig. 3, and illustrates how the work piece 13a is located above the varnish collecting trough 16 while varnish 52 flows from the varnish container 51 upon the work piece 13a both surfaces of which form the same angle α with the flow of the varnish from the varnish container 51 so that the excess of the applied varnish will uniformly flow into the varnish collecting trough 16.

It is, of course, to be understood that the present invention is, by no means, limited to the particular construction shown in the drawings but also comprises any modifications within the scope of the appended claims.

What I claim is:

1. A method of discharging varnish from a varnish discharging vessel simultaneously upon two surfaces of a workpiece that are inclined relative to each other, which includes the step of feeding said workpiece underneath said varnish discharging vessel with said inclined surfaces inclined in the direction of feed of said workpiece and with said inclined surfaces when underneath said vessel so located that each of said inclined surfaces forms an angle of substantially the same magnitude with the flow of varnish from said vessel upon said inclined surfaces while each of said angles forms an image of the other, and maintaining said inclined surfaces at said angle while varnish flows from said vessel over said inclined surfaces.

2. In an apparatus for discharging varnish simultaneously upon two surfaces of a workpiece which are inclined with regard to each other: a varnish discharging vessel, feeding means operable to feed a workpiece underneath said discharging vessel and tiltable in a direction transverse to the feeding movement of said feeding means, and selectively adjustable means for tilting and varying the inclination and securing said feeding means in a tilted position in which said two surfaces form with the horizontal plane two angles which have the same magnitude but form an image of each other.

3. In an apparatus for discharging varnish simultaneously upon two surfaces of a workpiece which are inclined with regard to each other: a varnish discharging vessel, feeding means operable to feed a workpiece underneath said discharging vessel, supporting means supporting said feeding means, means connected to said supporting means for tilting said feeding means and selectively varying the tilting angle thereof in a direction transverse to the feeding movement of said feeding means and also for securing said feeding means in a tilted position in which said two surfaces form with the horizontal plane two angles which have the same magnitude but form an image of each other, and holding means supported by said supporting means adjacent said feeding means for securing a workpiece in its respective position on said feeding means in the respective tilted position of the latter.

References Cited in the file of this patent

UNITED STATES PATENTS

| 389,242 | Palmer | Sept. 11, 1888 |
| 1,313,655 | Weinheim | Aug. 19, 1919 |
| 1,391,388 | Karl | Sept. 20, 1921 |
| 1,835,402 | Juers | Dec. 8, 1931 |

FOREIGN PATENTS

| 708,491 | Germany | July 23, 1941 |
| 525,839 | Canada | June 5, 1956 |